US012650900B2

(12) United States Patent
Alsalim

(10) Patent No.: US 12,650,900 B2
(45) Date of Patent: Jun. 9, 2026

(54) SYSTEM AND METHOD FOR DATA PROTECTION FOR STORAGE SYSTEMS

(71) Applicant: Saudi Arabian Oil Company, Dhahran (SA)

(72) Inventor: Ahmed Saad Alsalim, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 14 days.

(21) Appl. No.: 18/765,687

(22) Filed: Jul. 8, 2024

(65) Prior Publication Data

US 2026/0010432 A1      Jan. 8, 2026

(51) Int. Cl.
 *G06F 11/00* (2006.01)
 *G06F 11/10* (2006.01)
 *G06F 21/78* (2013.01)
(52) U.S. Cl.
 CPC .......... *G06F 11/1088* (2013.01); *G06F 21/78* (2013.01)
(58) Field of Classification Search
 CPC ............. G06F 11/1076; G06F 11/1088; G06F 11/1092; G06F 11/1435; G06F 11/2094; G06F 21/78
 See application file for complete search history.

(56) References Cited

U.S. PATENT DOCUMENTS

| | | | | |
|---|---|---|---|---|
| 5,586,250 | A * | 12/1996 | Carbonneau | G06F 21/86 |
| | | | | 714/48 |
| 7,058,762 | B2 * | 6/2006 | Patterson | G06F 11/1092 |
| | | | | 714/6.24 |

| | | | | |
|---|---|---|---|---|
| 7,562,249 | B2 | 7/2009 | Daikokuya et al. | |
| 8,086,893 | B1 * | 12/2011 | MacFarland | G06F 11/1088 |
| | | | | 714/6.22 |
| 8,099,623 | B1 * | 1/2012 | Li | G06F 11/1084 |
| | | | | 714/6.22 |
| 8,560,880 | B2 | 10/2013 | Soran et al. | |
| 9,921,912 | B1 | 3/2018 | Vankamamidi et al. | |
| 10,042,721 | B2 | 8/2018 | Condict et al. | |
| 10,331,520 | B2 | 6/2019 | Suryanarayana et al. | |

(Continued)

FOREIGN PATENT DOCUMENTS

CN          101576833 A     11/2009

OTHER PUBLICATIONS

Charlie Schluting; Storage Networking Basics: Configuring Disk Arrays; Enterprise Storage Forum; Sep. 28, 2007; 4 pages.

(Continued)

*Primary Examiner* — Marc Duncan
(74) *Attorney, Agent, or Firm* — Leason Ellis LLP

(57) ABSTRACT

A data protection method and system are provided. At least one computing device provides information representing failure of a drive that is assigned to a RAID group. Available storage on each of a plurality of drives in use in the RAID group is identified and at least one virtual drive is built using at least the available storage. Data associated with the failed drive is provided to the virtual drive(s). The virtual drive(s) is/are assigned to the RAID group, and appears to be the failed drive in a non-failed state. Information representing the failed drive having been replaced is received and data from the at least one virtual drive is provided to the replacement drive. The replacement drive is assigned to the RAID group. The replacement drive appears to the RAID controller to be the failed drive. The virtual drive(s) are released.

17 Claims, 7 Drawing Sheets

(56)     References Cited

U.S. PATENT DOCUMENTS

| | | | |
|---|---|---|---|
| 10,360,113 B2 | 7/2019 | Myers et al. | |
| 10,360,116 B2 | 7/2019 | Myers et al. | |
| 11,604,611 B2 | 3/2023 | Chopra et al. | |
| 2008/0126839 A1* | 5/2008 | Sangapu | G06F 11/1092 |
| | | | 714/E11.034 |
| 2010/0123992 A1* | 5/2010 | Huang | G06F 11/1092 |
| | | | 711/E12.001 |
| 2012/0226935 A1 | 9/2012 | Kishore et al. | |
| 2013/0132769 A1* | 5/2013 | Kulkarni | G06F 11/2094 |
| | | | 714/6.22 |
| 2019/0220379 A1 | 7/2019 | Li | |
| 2022/0075525 A1 | 3/2022 | Zheng | |
| 2022/0197570 A1* | 6/2022 | Nannapaneni | G06F 11/1092 |

OTHER PUBLICATIONS

Gillis et al.; RAID (redundant Array of independent disks); TechTarget
Network; https://www.techtarget.com/searchstorage/definition/
RAID; retreived Jul. 8, 2024; 10 pages.
Wu et al.; DROP: A New RAID Architecture for Enhancing Shared
RAID Performance; Abstract; The Computer Journal (vol. 60; Issue:
6, Jun. 2017); 4 pages.

* cited by examiner

602 DETERMINE NO AVAILABLE SPARE DRIVE IN RAID GROUP

604 IDENTIFY AVAILABLE STORAGE IN DRIVES ASSIGNED TO RAID GROUP

606 CREATE VIRTUAL DRIVE(S) USING AVAILABLE STORAGE IN DRIVES

608 ASSIGN VIRTUAL DRIVE TO RAID GROUP

610 RESTORE/REPLACE FAILED DRIVE(S)

612 RELEASE VIRTUAL DRIVE AND RETURN AVAILABLE STORAGE IN DRIVE(S)

600

SYSTEM AND METHOD FOR DATA PROTECTION FOR STORAGE SYSTEMS

FIELD OF THE DISCLOSURE

This patent application relates, generally, to computing storage technology and, more particularly, to providing data protection for storage systems.

BACKGROUND OF THE DISCLOSURE

Information technology systems in the enterprise can be configured in complex computer-based architectures that receive, store, process, and output large amounts of information, substantially in real-time. Such information can include content formatted in textual and multi-media formats, as well as programming instructions that, when executed by a computing device, result in data processing activity and various downstream processes. It is paramount for enterprise-wide information systems to provide nearly constant up-time and data availability.

Some of the complexity associated with enterprise information technology systems regards protection against data interruption and loss. In the event of hardware or software failure in a Redundant Array of Independent Drives ("RAID") group, for example, information technology specialists may allocate spare drive(s) to a RAID group and migrate data from a spare drive to active drives within a respective RAID group.

RAID installations can include one or more controllers that perform processing, including to monitor drive usage, detect faults, and record information (e.g., metadata) regarding member drives in a respective RAID group. In the event of drive failure, a spare programmable drive, which is not actively in use in a RAID group, can be used for reconstructing the failed drive. The spare drive replaces the failed drive and data from a back-up (e.g., a backup tape drive) is copied to the replacement drive. One or more spare failover drives can operate as "cold spares," as known in the art, and inter-storage controller communication can be implemented using at least one RAID controller and at least one non-RAID controller.

Unfortunately, attempts to protect against such data interruption and loss are often insufficient. It is with respect to these and other concerns that the present disclosure is provided.

SUMMARY OF THE DISCLOSURE

In one or more implementations of the present disclosure, a computer-implemented data protection method and system are provided. At least one computing device, receives information representing failure of a drive, wherein the drive is assigned to a Redundant Array of Independent Drives (RAID) group. The at least one computing device determines that the RAID group includes at least one available spare drive, and the at least one computing device builds at least one virtual drive using at least storage on the available spare drive. The at least one computing device provides data associated with the failed drive to the at least one virtual drive, and assigns the at least one virtual drive to the RAID group, wherein the at least one virtual group appears to a RAID controller associated with the RAID group to be the failed drive in a non-failed state. Further, the at least one computing device receives information representing the failed drive having been replaced by a replacement drive and provides data from the at least one virtual drive to the replacement drive. The at least one computing device assigns the replacement drive to the RAID group, wherein the replacement drive appears to the RAID controller to be the failed dive. Thereafter, the at least one computing device releases the at least one virtual drive from the RAID group.

In one or more implementations, the at least one virtual drive comprises a plurality of virtual drives. The at least one computing device provides to at least one of the plurality of virtual drives, parity data associated with failed drive. Moreover, the at least one computing device provides to at least one other of the plurality of virtual drives, non-parity data associated with failed drive.

In one or more implementations, the data associated with the failed drive and provided to the at least one virtual drive is data accessed at a frequency over a predetermined period of time.

In one or more implementations, the at least one computing device provides security measures, including locking drives assigned to the RAID group, and requires a physical key and a virtual key to unlock the drives.

In one or more implementations, a computer-implemented data protection method and system are provided. At least one computing device provides information representing failure of a drive, wherein the drive is assigned to a Redundant Array of Independent Drives (RAID) group. The at least one computing device identifies available storage on each of a plurality of drives in use in the RAID group. The at least one computing device builds at least one virtual drive using at least the available storage on the plurality of drives in use in the RAID group, and provides data associated with the failed drive to the at least one virtual drive. The at least one computing device assigns the at least one virtual drive to the RAID group, wherein the at least one virtual group appears to a RAID controller associated with the RAID group to be the failed drive in a non-failed state. Moreover, the at least one computing device receives information representing the failed drive having been replaced by a replacement drive. The at least one computing device provides data from the at least one virtual drive to the replacement drive and assigns the replacement drive to the RAID group, wherein the replacement drive appears to the RAID controller to be the failed drive. Moreover, the at least one computing device releases the at least one virtual drive from the RAID group.

In one or more implementations, the at least one computing device determines that the RAID group includes no available spare drive.

In one or more implementations, the at least one computing device builds the at least one virtual drive using at least storage on at least one other drive in use in another RAID group.

In one or more implementations, the at least one computing device builds at least one first virtual drive using at least the available storage on the plurality of drives in use in the RAID group. The at least one computing device builds at least one second virtual drive using the storage on the at least one other drive in use in the another RAID group. The at least one computing device combines the at least one first virtual drive and the at least one second virtual drive to build the at least one virtual drive.

In one or more implementations, wherein releasing, by the at least one computing device, the at least one virtual drive from the RAID group includes returning, by the at least one computing device, the available storage on the plurality of drives in use in the RAID group.

In one or more implementations, the at least one computing device accesses information representing the failed drive. Assigning the at least one virtual drive to the RAID group includes applying the information representing the failed drive to the at least one virtual drive.

In one or more implementations, the information representing the failed drive includes metadata.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF THE DISCLOSURE

By way of overview and introduction, technical method(s) and system(s) are provided that address problems associated with safeguarding and ensuring availability of data in the enterprise. Respective computer hardware arrangements can be provided, including computing devices configured with powerful processors, high-speed memory, and large capacity data storage. Processors can execute instructions that enable one or more computing devices to process requests, perform tasks, and present vast amounts of data clearly and concisely. This often includes collecting, generating, processing, outputting information in various formats. Such information (e.g., metadata) can be associated with drive operations and management processes. Moreover, computing devices can be configured to operate autonomously, which ensures safe and uninterrupted critical processing and functionality, as a function of discretely performed operations in a RAID group.

Additionally, the present disclosure improves handling of interruptions caused by, for example, drive malfunction, failure, or other occurrence that can preclude access to data. As used herein, a "drive," refers generally to at least one of a computing device, a component of a computing device, and a collection of computing devices configured for data storage. Drives can provide various storage functionality, including to receive and store data, and to provide access and retrieval to data. Drives can include disk array storage for block-based storage, file-based storage, and object-based storage, and be comprised in a RAID group including a plurality of hard disk drives, solid state drives, or both. Other types of drives can include optical storage media (e.g., discs suitable for storing digital data), and magnetic storage media (e.g., magnetic tapes suitable for storing analog and digital data). Disk arrays, including in RAID arrangements, can include computing devices suitably configured with processing capability (e.g., a RAID controller, a disk array controller or other device), and memory (e.g., RAM, flash memory, or other cache memory). Various other hardware components and arrangements provided in accordance with the present disclosure are shown and described with reference to FIGS. 2 and 3.

Features of the present disclosure can also include automatically performed operations that are implemented via computing program instructions executing on one or more processors. A data processing apparatus, for example, can interface with one or more RAID controllers and automatically leverage spare drives to store data and to rebuild failed drives quickly and completely, with little to no operational disruption or interruption in day-to-day operations. Moreover, and as shown and described herein, temporary virtual drives can be fashioned from existing drives within a respective RAID group to provide spare drive resources that are usable to provide improved data recovery, system performance, and reliability.

Figure 1:
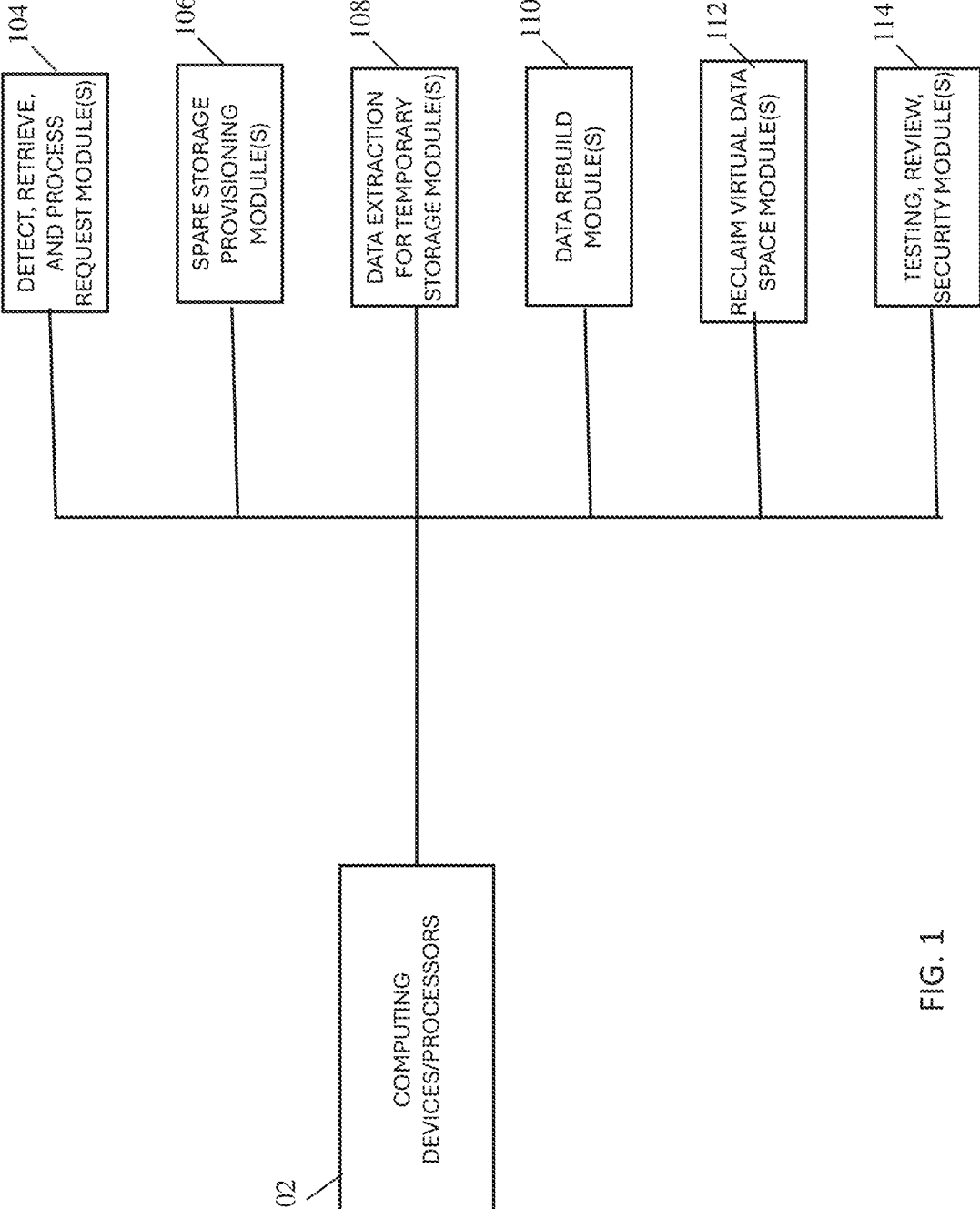
FIG. 1 is a simple block diagram illustrating a plurality of modules associated with one or more computing devices and processors, in connection with an example implementation of the present disclosure.

Referring now to the drawings, FIG. 1 is a simple block diagram illustrating a plurality of modules associated with one or more computing devices and processors, in connection with an example implementation of the present disclosure. As used herein, a module generally refers to a discrete unit of software and/or hardware that can operate in or as various components of a system or method. Modules can operate independently or in combination, including to be configured via programming instructions executed by one or more processors to provide operations shown and described herein.

Continuing with reference to FIG. 1, one or modules are provided in connection with data processing apparatus 102, to provide data protection and recovery measures. Such measures can anticipate or respond to failure of one or more drives, including within a single RAID group. As shown in FIG. 1, for example, module 104 includes hardware and/or software configured to detect, retrieve, and process instruction requests. Module 106, for example, can include hardware and/or software configured to provision spare storage for data management, as shown and described herein. Module 108, for example, can include hardware and/or software configured to extract data for temporary storage, and module 110 can include hardware and/or software configured to rebuild drives. Module 112, for example, can include hardware and/or software configured to reclaim virtual data space, and module 114 can include hardware and/or software configured to test and review systems, including following processes performed by any of modules 104-114. In addition, module 114 can include robust security measures to protect newly provisioned hardware components, including to prevent unauthorized access or tampering. For example, complex passcodes are employed, as well as physical locks, and stringent access controls that ensure the integrity and confidentiality of stored data. Such security measures complement other features shown and described herein, thereby providing comprehensive protection for enterprise storage systems that prevent, mitigate, and recover from potential security risks.

The present disclosure supports other strong security measures. In the event of drive failure, for example, data processing apparatus 102 can engage a system-wide lock to prevent a hardware engineer or other user from removing any other drive until data processing apparatus 102 completes a process of assigning a temporary replacement and rebuilding the data. The lock is released upon completion. Details regarding assigning a temporary replacement from available spare drives or by creating a virtual drive from an existing physical drive with sufficient free space, to accommodate the process, including restoring data from the failed or removed drive, are shown and described herein. Moreover, in cases where remaining storage drives are healthy and a hardware engineer or other user attempts to remove one of the healthy drives, the system locks to prevent further removals until data processing apparatus 102 completes the process of assigning a temporary replacement and rebuilding the data. The lock is released once the process is finalized.

Accordingly, the example modules illustrated in FIG. 1 can operate to manage spare drives and create temporary virtual drives to ensure seamless data operations, even following multiple systems failure. In certain instances, copies of "hot" data can be stored on spare drives, which can include data in use or that are readily available and stored in a data center (e.g., relatively close to operating CPUs, drives, and other modules). Maintaining copies of hot data on spare drives enhances data redundancy and resilience, and reduces the likelihood of data loss caused by, for example, concurrent drive failures.

Moreover, a data processing apparatus can utilize available spare drives to create an additional copy of hot data, which refers to frequently accessed data from all RAID groups. By virtually establishing a temporary RAID group from the spare drives, the system creates an extra layer of backup and protection for critical data that cannot afford to be lost under any circumstances, especially in the context of serving essential applications. Data processing apparatus 102 can be configured to interface with one or more controllers, including to identify temporary copies of data in the spare drives, thereby enabling a respective controller to utilize resources in the event of a major disaster or failure affecting a RAID group. This approach ensures that critical application data benefits from an additional protection layer.

In addition to the aforementioned protection measures, data processing apparatus 102 can utilize available spare drives to create an additional copy of hot data, which refers to frequently accessed data from all RAID groups. By virtually establishing a temporary RAID group from spare drives, an extra layer of backup and protection is provided for mission critical data-data serving essential applications in the enterprise. Data processing apparatus 102 can be configured to interface with one or more controllers 204, including to identify temporary copies of data in the spare drives, thereby enabling a respective controller 204 to utilize resources in the event of a major disaster or failure affecting a RAID group 202. This approach ensures that critical application data benefits from an additional protection layer.

Accordingly, the present disclosure includes a plurality of modules that, in combination, presents a comprehensive solution for data protection, system resilience, and supporting data operations in enterprise environments. Technological solutions are provided that anticipate, address, and prevent technical challenges, such as associated with drive failure, impediments to system scalability, interruptions, or loss of critical data.

Figure 2:
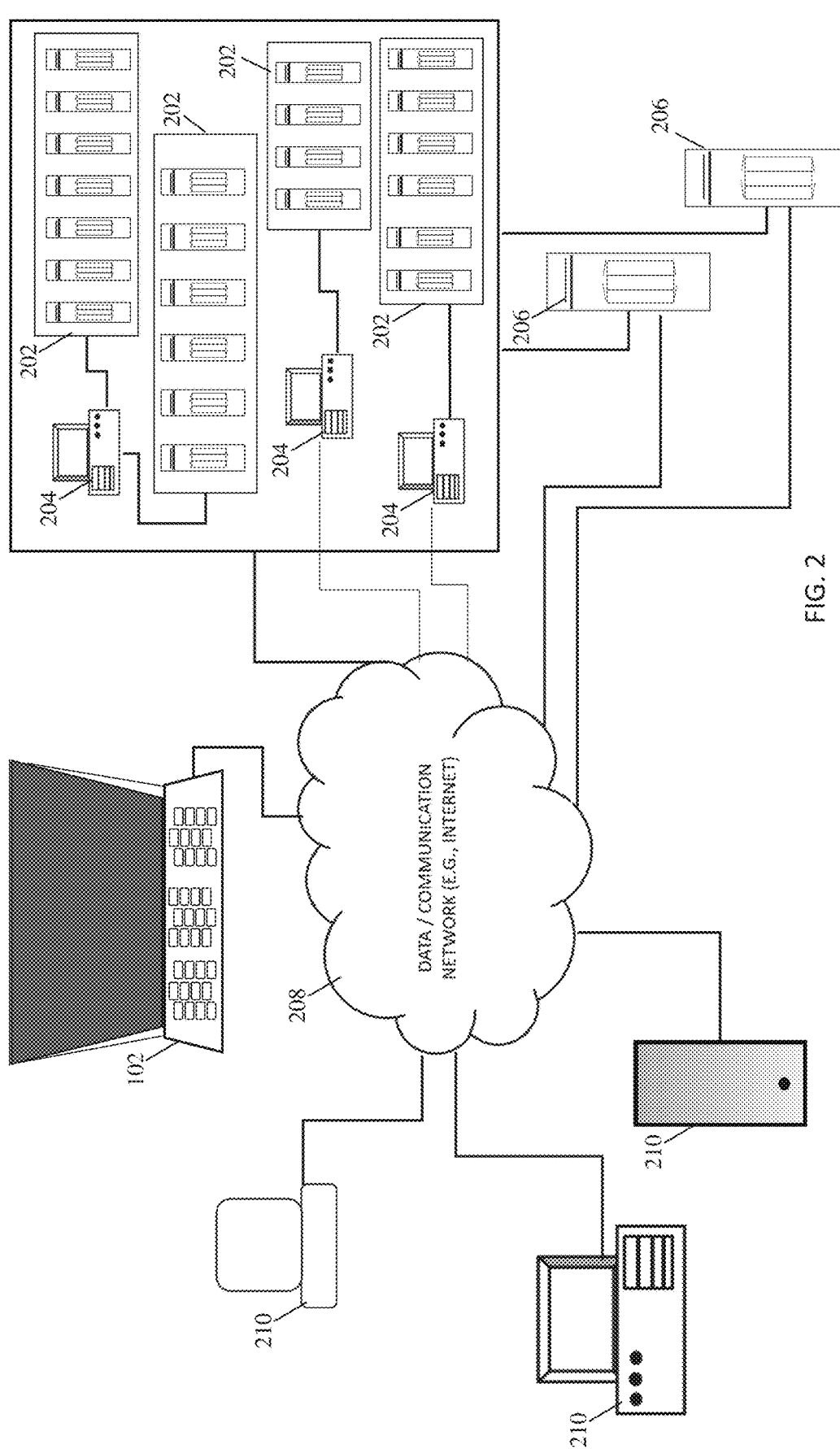
FIG. 2 illustrates an example hardware arrangement that operates for providing the systems and methods disclosed herein.

FIG. 2 illustrates an example hardware arrangement that operates for providing the systems and methods disclosed herein and designated generally as system 200. System 200 can include one or more data processing apparatus 102 that are coupled to one or more RAID groups 202, including physically coupled via Ethernet or other connection, or communicatively coupled across communication network 208. RAID groups 202 can include drives, such as physical disks, solid state disks (SSD), and combinations thereof. Moreover, data controllers 204 can be configured with RAID groups 202, including for management operations shown and described herein. Also as illustrated in FIG. 2, spare drives 206 are shown, which can be connected (e.g., physically and/or communicatively) to any one or more RAID group 202.

In one or more implementations of the present disclosure, a storage system employed in the enterprise can be broken down into multiple, smaller storage subsystems, each comprising a smaller group of storage (e.g., physical disks). These subsystems can function as separate storage systems, thereby providing enhanced manageability and performance. Additionally, new cache memories can be connected to each set of storage (e.g., physical disks), effectively distributing the workload and alleviating the burden on the main cache memory.

Data processing apparatus 102 and user computing devices 210 can include, for example, mobile computing devices such as tablet computing devices, smartphones, personal digital assistants or the like, as well as laptop computers and/or desktop computers, server computers and mainframe computers. Further, one computing device may be configured as data processing apparatus 102 and a user computing device 210, depending upon operations being executed at a particular time.

System 200 operates to satisfy current enterprise high-capacity storage demands for large amounts of critical data. RAID groups 202 include numerous large capacity storage drives, for example, having sizes of 16 terabytes or more, collectively supporting a total capacity that can exceed tens or more petabytes. System 200 can be provided in a modular configuration, which enables data processing apparatus(es) 102 and user computing device(s) 210 to be integrated within existing hardware or storage configurations, suitably and without undue customization and experimentation. Robust protection for storage data is provided, even in instances where multiple drives fail within a single physical RAID group 202.

Data processing apparatus 102 can be configured to access one or more databases for the present disclosure, including source code repositories, data repository, and configuration repositories. Source code repositories, for example, can store executable instructions that enable data processing apparatus 102 to provide functionality shown and described herein, and can be stored on processor readable media (e.g., non-transitory processor readable media).

Furthermore, data processing apparatus 102 can access databases via communication network 208 or any other communication network to which data processing apparatus 102 has access. Data processing apparatus 102 can communicate with devices comprising databases using any known communication method, including a direct serial, parallel, universal serial bus ("USB") interface, or via a local or wide area network.

User computing devices 210 can communicate with data processing apparatus 102 using data connections 108, which are respectively coupled to communication network 208. Communication network 208 can be any communication network, but typically is or includes the Internet or other computer network. Data connections 108 can be any known arrangement for accessing communication network 208, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 210 preferably have the ability to send and receive data across communication network 208, and can be equipped with web browsers, software disclosures, or other means, to provide received data on display devices incorporated therewith. By way of example, user computing device 210 may be personal computers such as Intel Pentium-class and Intel Core-class computers or Apple Macintosh computers, tablets, smartphones, but are not limited to such computers. In addition, the hardware arrangement of the present invention is not limited to devices that are physically wired to communication network 208, and that wireless communication can be provided between wireless devices and data processing apparatus 102.

System 200 preferably includes software that provides functionality described in greater detail herein, and preferably resides on one or more data processing apparatus 102 and/or user computing devices 210. Data processing apparatus 102 typically communicates with communication network 208 across a permanent i.e., un-switched data connection 108. Permanent connectivity ensures that access to data processing apparatus 102 is always available.

Figure 3:
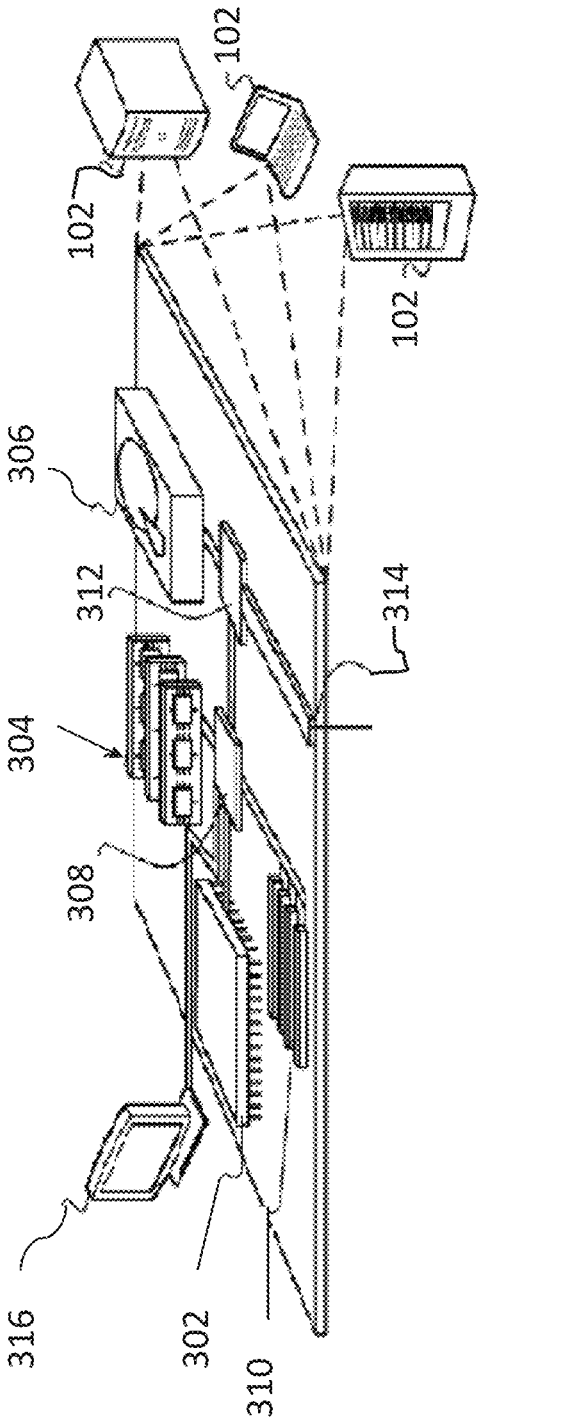
FIG. 3 shows an example data processing apparatus that can be used to implement the features, techniques, and functionality described herein.

FIG. 3 shows an example data processing apparatus 102 that can be used to implement the techniques described herein. The data processing apparatus 102 is intended to include one or more of various forms of digital computers, such as laptops, desktops, workstations, personal digital assistants, servers, blade servers, mainframes, and other appropriate computers. The components shown in FIG. 3, including connections and relationships, and their functions, are meant to be exemplary only, and are not meant to limit implementations of the inventions described and/or claimed in this document.

Continuing with the example implementation shown in FIG. 3, data processing apparatus 102 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and can be mounted on a common motherboard or in other manners as appropriate. The processor 302 can process instructions for execution within data processing apparatus 102, including instructions stored in the memory 304 or on the storage device 306 to display graphical information for a GUI on an external input/output device, such as a display 316 coupled to the high-speed interface 308. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 304 stores information within data processing apparatus 102. In some implementations, the memory 304 is a volatile memory unit or units. In some implementations, the memory 304 is a non-volatile memory unit or units. The memory 304 can also be another form of computer-readable medium, such as a magnetic or optical disk.

The storage device 306 is capable of providing mass storage for data processing apparatus 102. In some implementations, the storage device 306 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 304, the storage device 306, or memory on the processor 302.

The high-speed interface 308 can be configured to manage bandwidth-intensive operations, while the low-speed interface 312 can be configured to manage lower bandwidth-intensive operations. Of course, one of ordinary skill in the art will recognize that such allocation of functions is exemplary only. In some implementations, the high-speed interface 308 is coupled to the memory 304, the display 316 (e.g., through a graphics processor or accelerator), and to the high-speed expansion ports 310, which can accept various expansion cards (not shown). In an implementation, the low-speed interface 312 is coupled to the storage device 306 and the low-speed expansion port 314. The low-speed expansion port 314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, data processing apparatus 102 can be implemented in various forms. For example, computing technology arrangements can be implemented to include a single standard server or, alternatively, one or more groups of servers, as part of a rack server system, or combinations thereof or with other components, including mobile computing devices, computing networking hardware, disk storage processors, or the like.

In accordance with one or more implementation of the present disclosure, data processing apparatus 102 operates to enhance data protection in enterprise storage systems. For example, data processing apparatus 102 can be configured to execute instructions that include utilizing spare drives and separate cache memories, forming and assigning temporary drives in RAID configurations, and implementing rebuilding processes, with inclusion of parity data copies. These and other features that are shown and described herein form a computer architecture that protects critical data and ensures data availability, even in the presence of multiple simultaneous drive failures within a single RAID group.

Implementations of the present disclosure can include data processing apparatus 102 executing instructions to separate parity data from a respective RAID group 202. This can be accomplished, for example, by dedicating one or more drives for storing parity data associated with a respective RAID group 202, and removing the one or more drives from the respective RAID group 202. It is to be appreciated that parity data do have the same requirements as hot data and, accordingly, can be stored on less powerful storage than, for example, a RAID group 202. The present disclosure provides a technical advantage of utilizing less expensive drives while enabling fast and accurate remediation (e.g., rebuilding) of failed parity disks, for example, in case failure is detected.

Data processing apparatus 102 provides further enhanced data protection by safeguarding data stored in each drive group. For example, each RAID group 202 is connected to a controller including cache memories. Copies of parity data stored in the cache memory. Traditionally, if both the parity disk and another disk within the same group fail or become corrupted, all data stored in that group (whether it's a RAID group or drive box) would be permanently lost. By maintaining a copy of the parity data in a fast memory, the recovery process for the parity disk is expedited, subsequently facilitating the recovery of the data disk. This added redundancy ensures the integrity of the data and reduces the risk of permanent data loss.

Over time, a respective RAID group 202 will utilize all spare drives in the RAID group 202. In such case where no spare drive is available, for example, data processing apparatus 102 can be configured to provide drive restoration operations by using available storage space on drives currently utilized in the respective RAID group 202. Data processing apparatus 102 can be configured to create a temporary virtual drive from space that is available on multiple drives (e.g., physical drives) within a RAID group 202. Information from one or more failed drive(s) in the respective RAID group 202 can be distributed across the available space on the respective drives. The virtual drive(s) can be, as a function of one or more temporary virtual drives formed by data processing apparatus 102. More particularly, data processing apparatus 102 can manage information representing respective portions of data stored on respective drive(s). Further, information representing the impacted drive can be added to each new temporary virtual drive, thereby, which provides consistency and improves data integrity. Using the data stored across the drives, operations within the respective RAID group 202 can continue unimpeded as the one or more temporary virtual drives operate in place (or in conjunction with) the failed or impacted drive.

In one or more implementations of the present disclosure, data processing apparatus 102 can be configured to provide information representing the statuses of all drives within the respective RAID group 101 as healthy, notwithstanding one or more failed drives have not yet been replaced. The one or more virtual drives effectively take over for the failed drive(s). One or more storage controllers in a respective RAID group 202 is unaware that the new temporary location differs from the original location. Thereafter, the temporarily virtual drive assigned to the RAID group 202 is released and the space on the respective drives unclaimed, for future use.

Once the failed drive has been replaced, data processing apparatus 102 can at least initiate data restoration processes without interrupting operations. This solution protects data in advance of subsequent drive failures within the same RAID group. Once a drive fails, data are immediately created on the temporary virtual drive(s), which are assigned to the RAID group 202. This provides engineers with sufficient time to diagnose and replace a drive, with significantly decreased concern of another hard drive failure in the RAID group 202 resulting in permanent data loss or operational interruption.

Figure 4A:
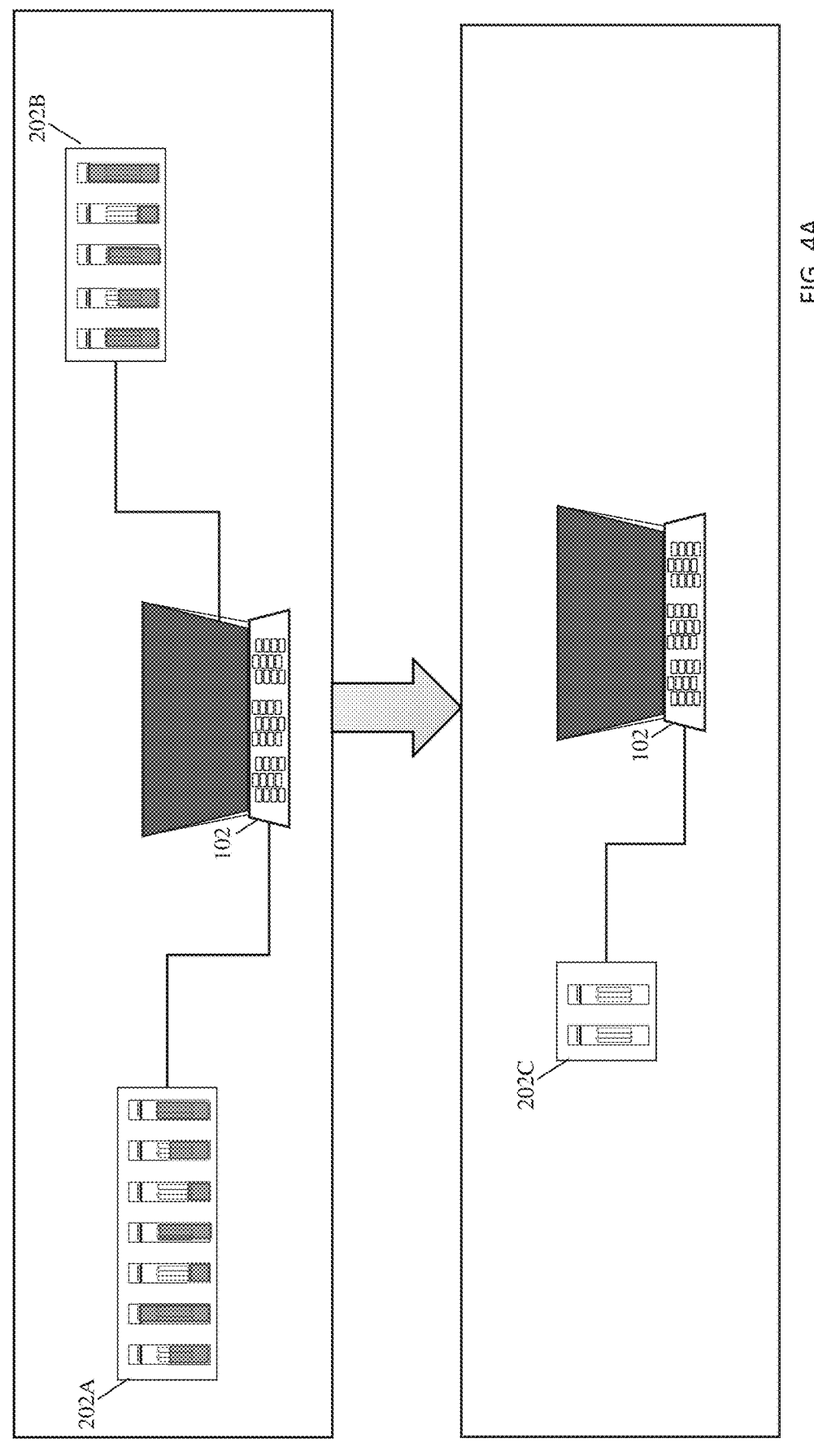
FIG. 4A illustrates an implementation that includes a data processing apparatus configured by executing instructions stored on processor readable media to virtually combine two RAID groups into one large virtual RAID group.

Referring to FIG. 4A, implementations can include data processing apparatus 102 configured by executing instructions stored on processor readable media to virtually combine two RAID groups 202 into one large virtual RAID group 202. As shown in FIG. 4A, portions of respective drives included in RAID groups 202A and 202B are shown formatted in grey. Greyed portions of the drives included in RAID groups 202A and 202B represent storage space that is occupied by stored data. Clear portions of the drives included in RAID groups 202A and 202B represent storage space that is available for storage. Data processing apparatus 102 can be configured by executing instructions to locate available storage space in respective drives arranged within RAID groups 202A and 202B. Data processing apparatus 102 can be further configured to create one or more temporary virtual drives using the drive space claimed, for example, from the non-greyed areas of the drives shown in FIG. 4A.

Figure 4B:
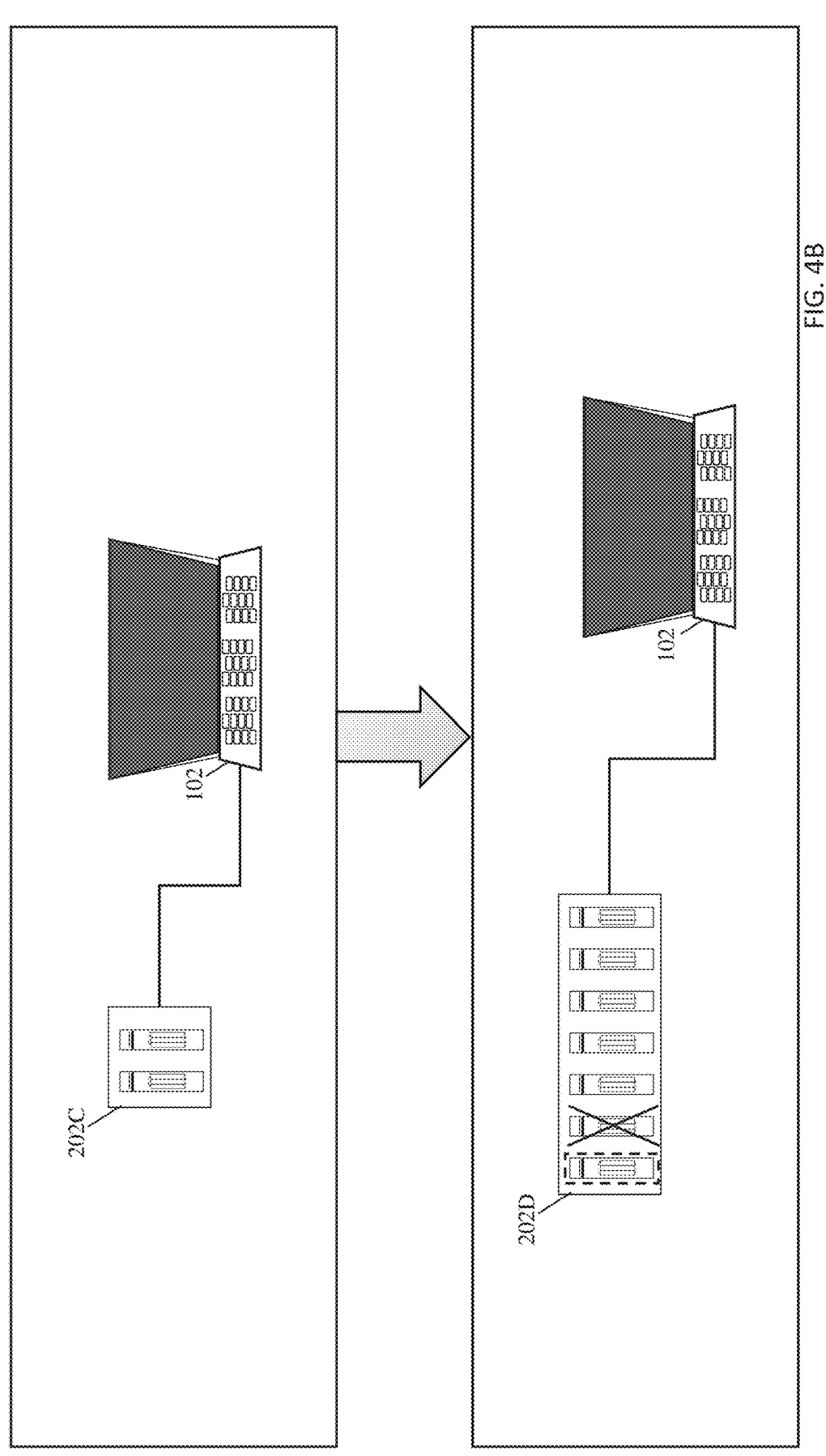
FIG. 4B illustrates an implementation that includes a data processing apparatus adding temporary virtual drive(s) to one or more virtual RAID groups.

With reference to FIG. 4B, data processing apparatus 102 (e.g., via module 106) is illustrated and configured to add the temporary virtual drive(s) to one or more virtual RAID groups 202C. Data processing apparatus 102 is so configured, notwithstanding available storage from the constituted in the virtual drive(s) is located in drives from separate and distinct RAID groups (e.g., RAID groups 202A and 202B). In the event of failure of one or more drives in a respective RAID group 202 (e.g., RAID group 202D shown in FIG. 4B), data can be retrieved from the virtual drives set forth in RAID group 202C and used to rebuild the failed drive(s), expectedly before yet another drive fails within the RAID group 202D. This technical architecture enables separate RAID groups 202 to function independently and completely, while simultaneously contributing to a single combined RAID group accommodating data loss prevention and recovery.

In one or more implementations of the present disclosure, following disk failure, data processing apparatus 102 manages virtual drives in newly defined RAID group 202C as if they were the original, pre-failed drive(s). This can continue seamlessly by data apparatus 102 (including in one or more implementations via one or more respective data controllers 204), ensuring uninterrupted production data operations. This represents a significant improvement over storage systems that reserve spare drives for future use, by employing virtual RAID groups immediately in the event of drive failure within any production-based RAID group. Moreover, use of virtual RAID group 202C temporarily in production eliminates a need to rush to replace failed drive(s). After the spare drive is temporarily assigned to the RAID group, the controller is informed (e.g., by data processing apparatus 102) that all drives within the group are healthy.

As noted herein, in one or more implementations of the present disclosure, data processing apparatus 102 can be configured to copy hot data, including data that are frequently accessed over a given time period. The hot data can be copied to a spare drive or to a temporary virtual drive, thereby providing an additional layer of data protection. Data processing apparatus 102 can be configured to automatically identify data that are accessed more frequently than other data in a system. For example, as a function of logs or other suitable data source, data processing 102 can be configured further for decision-making processes, including to determine particular data that is to be copied to a spare drive (e.g., in a spare drive group).

Accordingly, the present disclosure overcomes technical shortcomings of traditional storage RAID group data management and operations in connection with data type. One such implementation can include managing parity data. As known in the art, parity data are stored in RAID group architectures, and can include information representing the integrity of stored data, for example, redundancy checks can be performed on data to ensure that has been no corruption, unintended data alteration, loss, or other concern. Data processing apparatus 102 can configure at least one virtual drive in RAID group 202C to store production data, and configures at least one virtual drive in RAID groups 202C to store parity data associated with the stored production data. In such arrangement, data processing apparatus 102 enhances data protection against drive failures and recovery. In the event that a drive fails, the spare drive storing production data is utilized to rebuild the failed drive, and the data do not suffer loss in integrity.

Moreover, in cases where all spare drives available in the storage system are fully utilized by RAID groups 202, data processing apparatus 202 can cause a temporary virtual drive to be created within a healthy physical drive in the same RAID group 202. Data apparatus 102 can be configured to copy metadata and other information from the failed drive to the newly assigned drive.

In cases where no drive within the same RAID group has enough free space to accommodate the data from the failed drive, data processing apparatus 102 can be configured to temporarily combines a selection of drives assigned to at least one other RAID group 202, but within a single drive enclosure, and create a virtual drive comprising a consolidation of resources. Data processing apparatus 102 can identify a drive having sufficient free space, for example, to host a temporary virtual sub-drive, for rebuilding the failed drive using the data therefrom. Once the failed drive is replaced and restored to a healthy state, data processing apparatus 102 separates the two RAID groups 202 involved in the temporary consolidation. Combining and separating RAID groups 202 ensures minimal impact on ongoing operations, as the steps are executed virtually and temporarily, which further safeguards the integrity of the system.

Furthermore, data processing apparatus 102 can be configured to monitor and manage utilization of spare drives. For example, data processing apparatus 102 generates and transmits notifications in case data have been removed from spare drives, such as due to infrequent access or when spare drives are required for assignment to a RAID group. This allows data processing apparatus 102 to efficiently utilize available free space on spare drives for other data storage needs. When spare drives are assigned to a RAID group for new applications, data processing apparatus 102 can selectively remove the least critical or least frequently accessed data from the backup data. Only the hottest data that can be accommodated within the available free space on spare drives is retained as a backup. The storage controller continues to operate under the assumption that spare drives hosting critical data copies remain free and available for use in the aforementioned protection measures.

Thus, as shown and described herein, data processing apparatus 102 can provide crucial operations. Data protection and system resilience is significantly improved in implementations of the present disclosure, including during data migration processes, and the risk of future failure is significantly reduced. For example, without limitation, data processing apparatus 102 provides data storage and management of information (e.g., metadata). Data processing apparatus 102 can serve as a repository that stores metadata and information relating to the data, such as details representing about the storage, RAID groups, temporary virtual drives, and information regarding data duplication in spare drives.

Moreover, data processing apparatus 102 performs drive monitoring and management, including for storage. In the event of a drive failure, data processing apparatus 102 can identify and assign a new drive as a temporary replacement for a failed one. If no free spare drives are available, data processing apparatus 102 can create a new virtual drive and assign the same drive information as the failed drive. Accordingly, data processing apparatus 102 can be configured to handle creation of a virtual drive and ensure necessary drive information is copied accurately thereto.

In one or more implementations, data processing apparatus 102 operates independently from one or more controllers 204, and performs specialized and focused operations, such as to maintain information representing temporary configurations to be maintained during drive failures and which virtual drive will be used as a temporary replacement. It is also responsible for restoring data from the temporary drive to the original drive after replacement.

Figure 5:
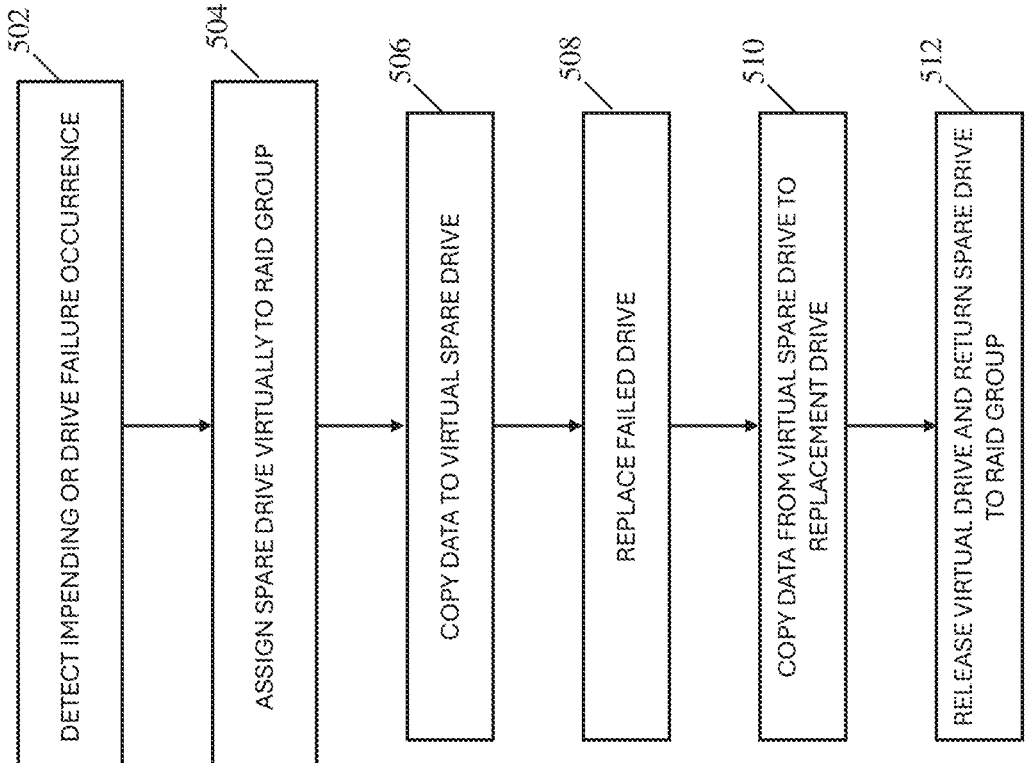
FIG. 5 illustrates a process flow, including steps associated with drive recovery in accordance with an example implementation of the present disclosure.
Figure 5:

Referring now to FIG. 5, a process flow 500 is illustrated and describing steps associated with drive recovery in accordance with an example implementation of the present disclosure. The process 500 can be performed by a processor executing instructions in a computer-readable storage medium, for example via at least data processing apparatus 102. It is to be appreciated that several of the logical operations described herein are implemented as a sequence of computer-implemented acts or program modules running on one or more computing devices. Accordingly, the logical operations described herein are referred to variously as operations, steps, structural devices, acts and modules can be implemented in software, in firmware, in special purpose digital logic, and any combination thereof. It is also to be appreciated that more or fewer operations can be performed than shown in the figures and described herein. Machine learning operations can be implemented, for example, using neural networks, which can be implemented on traditional computing systems as well as emerging neuromorphic systems. Furthermore, these operations can be performed in a different order than those described herein.

Continuing with reference to FIG. 5, data processing apparatus 102 can detect an imminent drive failure, or the occurrence of drive failure, in a respective RAID group 202 (step 502). Thereafter, data processing apparatus 102 can identify at least one spare drive that is available in the RAID group 202, and can assign the spare drive virtually to the RAID group 202 (step 504). For example, data processing apparatus 102 can build a virtual drive using the spare drive, and assign the virtual drive to the RAID group 202. Thereafter, at step 506, data from the failed drive (or to be failed drive) is copied to the virtual drive, and the failed drive is replaced (step 508). At step 510, data processing apparatus 102 copies the failed drive(s) data from the virtual drive to the replacement drive. Data processing apparatus 102 can represent the virtual drive as the failed drive, but now fully operational (e.g., via information representing the drive having a healthy status). Accordingly, data processing apparatus 102 enables data processing operations to continue unimpeded in RAID group 202. Once complete, the virtual drive is released and the spare drive made available to the RAID group 202.

Figure 6:
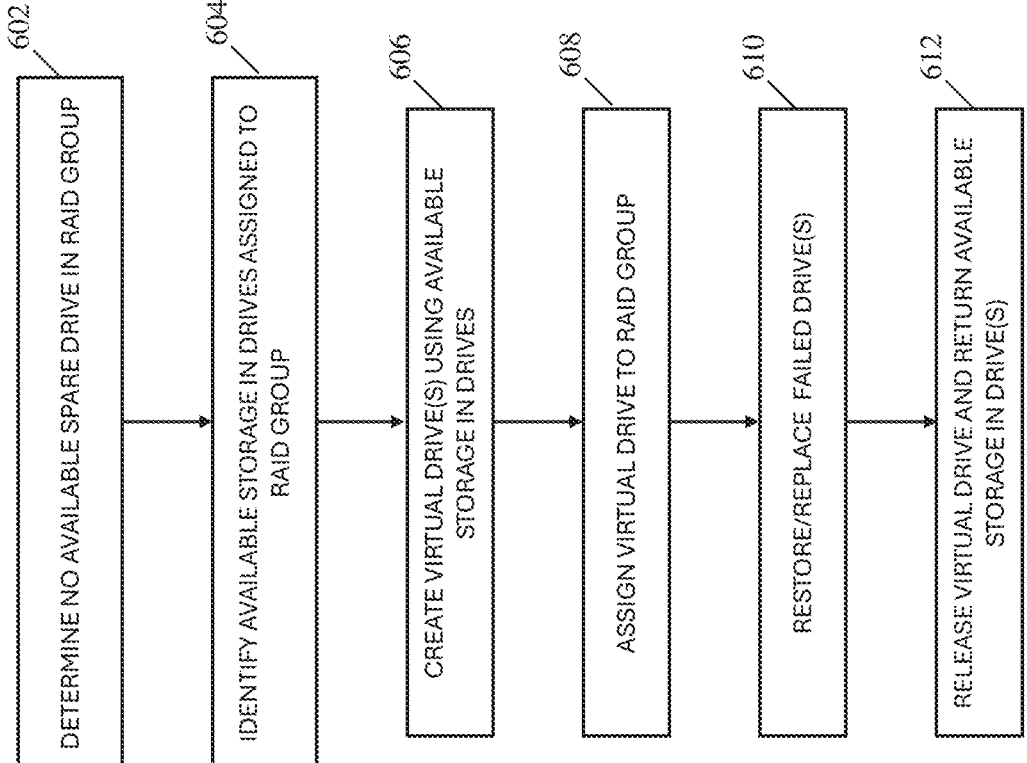
FIG. 6 illustrates a process flow, including steps associated with drive recovery in accordance with an example implementation of the present disclosure.
Figure 6:
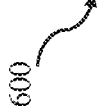

FIG. 6 illustrates a process flow 600, including steps associated with drive recovery processes in accordance with an example implementation of the present disclosure. After detecting impending or current drive failure (step 502, FIG. 5), data processing apparatus 102 can determine that no available spare drive in a RAID group is available for use in connection with a virtual drive. Accordingly, contrary to step 504 (FIG. 5), data processing apparatus 102 identifies available storage in respective drives that are currently assigned or will be assigned to the RAID group 202 (step 604). Thereafter, data processing apparatus 102 builds a virtual drive using the available storage in one or more assigned drives (step 606). At step 608, the virtual drive is assigned to the RAID group 202. The failed drive(s) are restored or replaced (step 610) and, once complete, data processing apparatus 102 releases the virtual drive and returns the storage to the assigned drive(s) in the RAID group 202 that was used in connected with the virtual drive (step 612). Thus, and in accordance with the implementation shown in FIG. 6, features of the present disclosure can be implemented in instances where no spare drive is available in a RAD group 202.

The present disclosure provides technological improvements, including by providing additional caches connected to drive groups, which store frequently accessed data and significantly enhances response times of storage drives to a main cache. Traditionally, when data are not available in a main cache, an additional step to retrieve the required data from multiple drives is required, which increases response time proportional to the number and size of the drives. By introducing additional cache memories that store the most frequently accessed data of each drive group, performance is greatly improved. A main cache can directly access the new caches to retrieve highly used data, effectively breaking down the large number of storage disks into smaller virtual storage subsystems.

Implementations of the present disclosure can include new generations of enterprise storage systems, characterized by supporting massive scale, accommodating a large number of storage of vast amounts of mission-critical data, and supporting various applications. Given the digitalization of most applications and their reliance on enterprise storage systems, it becomes imperative to significantly enhance data protection while minimizing disruptive changes to the existing infrastructure.

The present disclosure includes improved data protection and availability, including, particularly when in case of multiple drive failures within a single physical RAID group 202. By implementing these innovative steps, the present disclosure provides an effective solution to technical problems associated with data protection and continuous availability in enterprise storage systems. Accordingly, the present disclosure improves and automates management and handling of enterprise information technology systems. Storage systems can be parsed or broken down virtually, and cache memories can be distributed therein. Implementing a virtual breakdown of storage subsystems and distributing cache memories represents an innovative change to enterprise-wide information technology storage system architecture. Such enhancements improve system manageability, performance, and data protection, and address common challenges associated with large-scale storage environments. Data access and recovery processes are optimized, timely responses to user requests are provided and downtime is minimized as a function incorporating additional cache memories and separating parity from data. RAID systems can include a parity drive that provides fault tolerance.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 5G (or faster) cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one disclosure and/or at least one computer. The database can include a structured collection of records or data organized according to a database model, such as, for example, but not limited to at least one of a relational model, a hierarchical model, a network model or the like. The database can include a database management system disclosure (DBMS) as is known in the art. The disclosure may include, but is not limited to, for example, executable program instructions that, when executed, enable a device to accept connections to service requests from clients by sending back responses to the clients. The database can be configured to run the disclosure, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one disclosure and/or at least one computer to perform services for connected clients as part of a client-server architecture. The server disclosure can include, but is not limited to, for example, an disclosure program that can accept connections to service requests from clients by sending back responses to the clients. The server can be configured to run the disclosure, often under heavy workloads, unattended, for extended periods of time with minimal human direction. The server can include a plurality of computers configured, with the disclosure being divided among the computers depending upon the workload. For example, under light loading, the disclosure can run on a single computer. However, under heavy loading, multiple computers can be required to run the disclosure. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The invention encompassed by the present disclosure has been described with reference to the accompanying drawings, which form a part hereof, and which show, by way of illustration, example implementations and/or embodiments. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various disclosures such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed is:

1. A computer-implemented data protection method, the method comprising:

receiving, by at least one computing device, information representing failure of a drive, wherein the drive is assigned to a Redundant Array of Independent Drives (RAID) group;

determining, by the at least one computing device, that the RAID group includes at least one available spare drive;

building, by the at least one computing device, at least one virtual drive using at least storage on the available spare drive;

providing, by the at least one computing device, data associated with the failed drive to the at least one virtual drive;

assigning, by the at least one computing device, the at least one virtual drive to the RAID group, wherein the at least one virtual group appears to a RAID controller associated with the RAID group to be the failed drive in a non-failed state;

receiving, by the at least one computing device, information representing the failed drive having been replaced by a replacement drive;

providing, by the at least one computing device, data from the at least one virtual drive to the replacement drive;

assigning, by the at least one computing device, the replacement drive to the RAID group, wherein the replacement drive appears to the RAID controller to be the failed dive;

releasing, by the at least one computing device, the at least one virtual drive from the RAID group;

providing, by the at least one computing device, security measures including locking drives assigned to the RAID group; and requiring, by the at least one computing device, a physical key and a virtual key to unlock the drives.

2. The method of claim 1, wherein the at least one virtual drive comprises a plurality of virtual drives, and further comprising:

providing, by the at least one computing device to at least one of the plurality of virtual drives, parity data associated with failed drive; and providing, by the at least one computing device to at least one other of the plurality of virtual drives, non-parity data associated with failed drive.

3. The method of claim 1, wherein the data associated with the failed drive and provided to the at least one virtual drive is data accessed at a frequency over a predetermined period of time.

4. A computer-implemented data protection method, the method comprising:

receiving, by at least one computing device, information representing failure of a drive, wherein the drive is assigned to a Redundant Array of Independent Drives (RAID) group;

identifying, by the at least one computing device, available storage on each of a plurality of drives in use in the RAID group;

building, by the at least one computing device, at least one virtual drive using at least the available storage on the plurality of drives in use in the RAID group;

providing, by the at least one computing device, data associated with the failed drive to the at least one virtual drive;

assigning, by the at least one computing device, the at least one virtual drive to the RAID group, wherein the at least one virtual group appears to a RAID controller associated with the RAID group to be the failed drive in a non-failed state;

receiving, by the at least one computing device, information representing the failed drive having been replaced by a replacement drive;

providing, by the at least one computing device, data from the at least one virtual drive to the replacement drive;

assigning, by the at least one computing device, the replacement drive to the RAID group, wherein the replacement drive appears to the RAID controller to be the failed dive;

releasing, by the at least one computing device, the at least one virtual drive from the RAID group;

providing, by the at least one computing device, security measures including locking drives assigned to the RAID group; and requiring, by the at least one computing device, a physical key and a virtual key to unlock the drives.

5. The method of claim 4, further comprising:

determining, by the at least one computing device, that the RAID group includes no available spare drive.

6. The method of claim 4, further comprising:

building, by the at least one computing device, the at least one virtual drive using at least storage on at least one other drive in use in another RAID group.

7. The method of claim 6, further comprising:

building, by the at least one computing device, at least one first virtual drive using at least the available storage on the plurality of drives in use in the RAID group;

building, by the at least one computing device, at least one second virtual drive using the storage on the at least one other drive in use in the another RAID group; and combining, by the at least one computing device, the at least one first virtual drive and the at least one second virtual drive to build the at least one virtual drive.

8. The method of claim 4, wherein releasing, by the at least one computing device, the at least one virtual drive from the RAID group includes:

returning, by the at least one computing device, the available storage on the plurality of drives in use in the RAID group.

9. The method of claim 4, further comprising:

accessing, by the at least one computing device, information representing the failed drive, wherein assigning the at least one virtual drive to the RAID group includes:

applying the information representing the failed drive to the at least one virtual drive.

10. The method of claim 9, wherein the information representing the failed drive includes metadata.

11. A computer-implemented data protection system, the system comprising:

at least one computing device, wherein the at least one computing device is configured by executing instructions for:

receiving information representing failure of a drive, wherein the drive is assigned to a Redundant Array of Independent Drives (RAID) group;

identifying available storage on each of a plurality of drives in use in the RAID group;

building at least one virtual drive using at least the available storage on the plurality of drives in use in the RAID group;

providing data associated with the failed drive to the at least one virtual drive;

assigning the at least one virtual drive to the RAID group, wherein the at least one virtual group appears to a RAID controller associated with the RAID group to be the failed drive in a non-failed state;

receiving information representing the failed drive having been replaced by a replacement drive;

providing data from the at least one virtual drive to the replacement drive;

assigning the replacement drive to the RAID group, wherein the replacement drive appears to the RAID controller to be the failed dive;

releasing the at least one virtual drive from the RAID group;

providing, by the at least one computing device, security measures including locking drives assigned to the RAID group; and requiring, by the at least one computing device, a physical key and a virtual key to unlock the drives.

12. The system of claim 11, wherein the at least one computing device is further configured by executing instructions for:

determining that the RAID group includes no available spare drive.

13. The system of claim 11, wherein the at least one computing device is further configured by executing instructions for:

building the at least one virtual drive using at least storage on at least one other drive in use in another RAID group.

14. The system of claim 11, wherein the at least one computing device is further configured by executing instructions for:

building at least one first virtual drive using at least the available storage on the plurality of drives in use in the RAID group;

building at least one second virtual drive using the storage on the at least one other drive in use in the another RAID group; and combining the at least one first virtual drive and the at least one second virtual drive to build the at least one virtual drive.

15. The system of claim 11, wherein releasing, by the at least one computing device, the at least one virtual drive from the RAID group includes:

returning the available storage on the plurality of drives in use in the RAID group.

16. The system of claim 11, wherein the at least one computing device is further configured by executing instructions for:

accessing information representing the failed drive, wherein assigning the at least one virtual drive to the RAID group includes:

applying the information representing the failed drive to the at least one virtual drive.

17. The system of claim 16, wherein the information representing the failed drive includes metadata.

* * * * *